United States Patent [19]

Harada et al.

[11] Patent Number: 5,396,460
[45] Date of Patent: Mar. 7, 1995

[54] FIFO MEMORY IN WHICH NUMBER OF BITS SUBJECT TO EACH DATA READ/WRITE OPERATION IS CHANGEABLE

[75] Inventors: Moemi Harada; Shunichi Akashi, both of Tokyo, Japan

[73] Assignee: NEC Corporation, Tokyo, Japan

[21] Appl. No.: 58,376

[22] Filed: May 10, 1993

[30] Foreign Application Priority Data

May 15, 1992 [JP] Japan ................................. 4-122446
Nov. 12, 1992 [JP] Japan ................................. 4-302078
Nov. 13, 1992 [JP] Japan ................................. 4-303438

[51] Int. Cl.⁶ .............................................. G11C 7/00
[52] U.S. Cl. .......................... 365/189.01; 365/189.12; 365/240
[58] Field of Search ...................... 365/189.01, 189.12, 365/239, 240, 189.04

[56] References Cited

U.S. PATENT DOCUMENTS 5,142,494 8/1992 D'Luna ...................... 365/189.12 X
5,200,925 4/1993 Morooka ................... 365/189.12 X
5,272,675 12/1993 Kobayashi ................. 365/189.12 X

*Primary Examiner*—Do Hyun Yoo
*Attorney, Agent, or Firm*—Sughrue, Mion, Zinn, Macpeak & Seas

[57] ABSTRACT

A FIFO memory is disclosed which includes a plurality of memory cells, a mode circuit designating a first or a second mode in response to a mode signal supplied thereto, a selection circuit for selecting a first number of the memory cells each time a clock signal is generated in the first mode and for selecting a second number of the memory cells each time the clock signal is generated in the second mode, the first number being different from the second number, and an access circuit for accessing the selected memory cells to write data thereinto and to read data therefrom, whereby the number of memory cells to accessed is changeable in the mode to be performed.

11 Claims, 7 Drawing Sheets

TRI-STATE OUTPUT BUFFER

FIFO MEMORY IN WHICH NUMBER OF BITS SUBJECT TO EACH DATA READ/WRITE OPERATION IS CHANGEABLE

BACKGROUND OF THE INVENTION

The present invention relates to a first-in first-out memory device (called hereinafter "FIFO memory") and, more particularly, to a FIFO memory suitable for being employed in a video signal processing field such as a plane paper copier (PPC) or a facsimile apparatus (FAX).

A FIFO memory is such that data which has been written first is read out first and is thus widely employed for a serial-processing operation on data of each line in the PPC or FAX. Since a data write operation into the FIFO memory is performed in asynchronism with a data read operation therefrom, the FIFO memory includes a write control circuit independently of a data read control circuit.

Referring to FIG. 10, the FIFO memory according to the prior art includes a memory cell array 1 having a number of words each includes a plurality of bits, the number of which is equal to the number of bits of write data DTw and also equal to the number of bits of read data DTr. The write data DTw is written into the memory cell array one word by one word under the control of a write control circuit 2 responsive to a write clock signal CKw and a write reset signal RSTw. In a data read operation, on the other hand, a read control circuit 3 accesses the memory cell array to read data therefrom one word by one word in response to a read clock signal CKr and a read reset signal RSTr.

In the FIFO memory employed in the PPC or FAX, the depth of its memory capacity, i.e. the number of words, is determined in accordance with a paper size and/or resolution. For example, a paper of A3 size is used lengthwise (i.e., 297 mm) with the resolution of 40 dpi (i.e., 40 dots/mm), the FIFO memory is required to have a memory capacity of about 5K words. On the other hand, the number of bits (i.e., the bit width) of each word is determined in accordance with scale. In case of 256 scale for example, the bit width of 8-bit is required.

Thus, the FIFO memory is requested to be changeable in the number of words and accordingly in the number of bits of each word in order to satisfy the various required performances. However, the FIFO memory shown in FIG. 10 has neither function nor circuit of changing the number of bits of each word or the number of words.

SUMMARY OF THE INVENTION

It is therefore an object of the present invention to provide an improved FIFO memory.

It is another object of the present invention to provide a FIFO memory in which each word is changeable in number of bits.

A FIFO memory according to the present invention comprises a plurality of memory cells, a mode designation circuit for designating a first or a second mode in response to a mode signal supplied thereto, selection circuit for selecting a first number of the memory cells each time a clock signal is supplied thereto in the first mode and for selecting a second number of the memory cells each time the clock signal is supplied thereto in the second mode, the first number being different from the second number, and an access circuit for accessing the selected memory cell.

Thus, the number of the memory cells to be accessed is changeable in accordance with an operation mode to be performed.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE INVENTION

Figure 1:
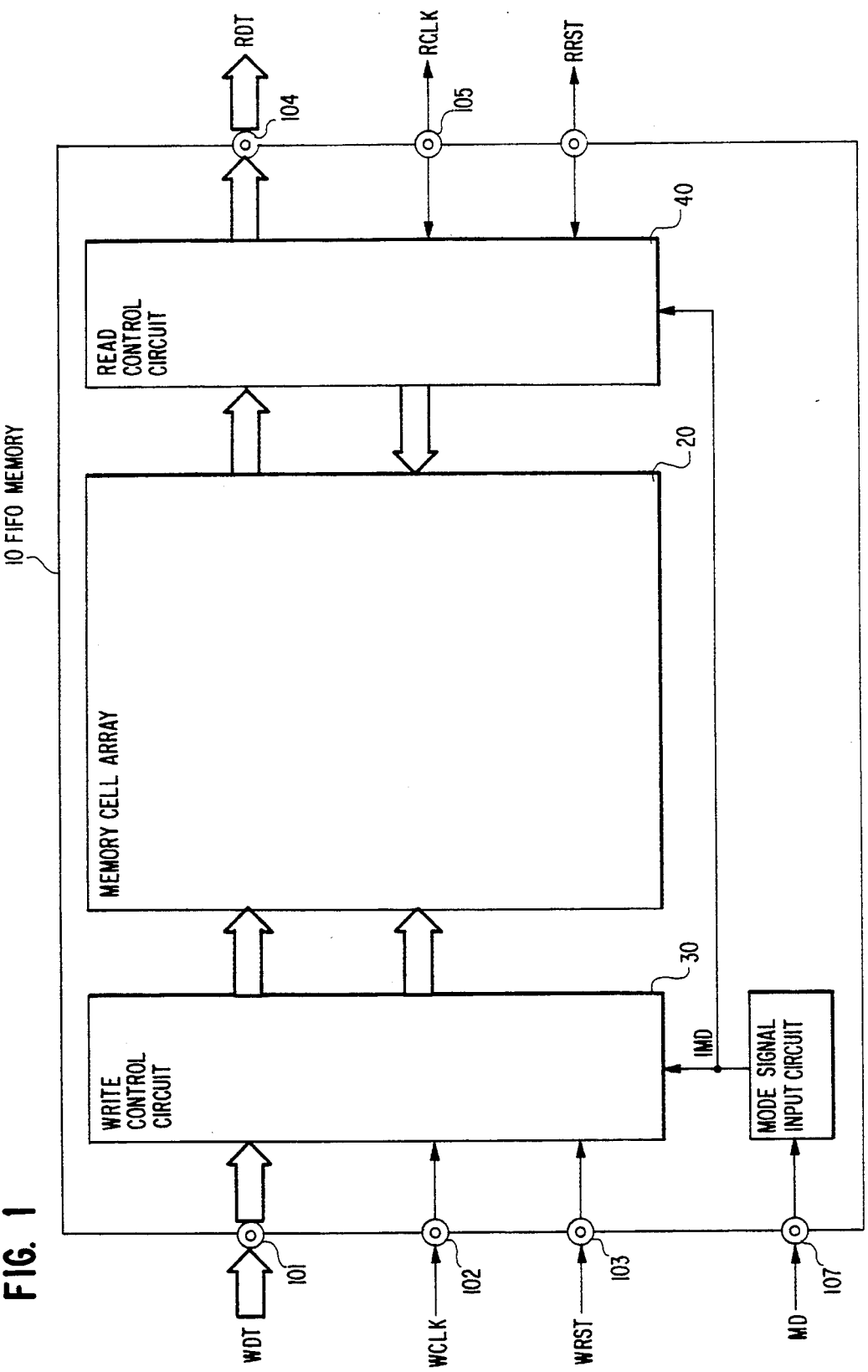
FIG. 1 is a block diagram illustrating a FIFO memory according to an embodiment of the present invention.
Figure 10:
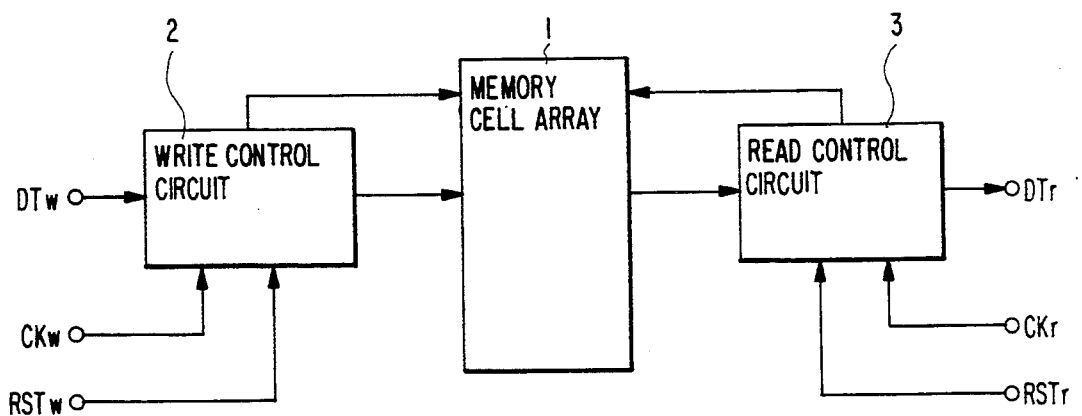
FIG. 10 is a block diagram illustrative of a FIFO memory according to the prior art.

Referring to FIG. 1, a FIFO memory 10 according to an embodiment of the present invention is fabricated as an integrated circuit device and includes a memory cell array 20, a write control circuit 30 and a read control circuit 40 similarly to the memory shown in FIG. 10. However, the present FIFO memory 10 further includes a mode signal input circuit 50 supplied with a mode signal MD via a terminal 107 and the write and read control circuits 30 and 40 operate to change the number of bits to be accessed in response to the level of the mode signal MD. In the present embodiment, there are provided a first mode in which one word is constructed of 8 bits and a second mode in which one word is constructed of 16 bits. The mode signal MD takes the high level to designate the first mode and the low level to designate the second mode. The mode signal input circuit 50 detects the level of the mode signal MD and then supplies the detected level to the circuits 30 and 40 as an internal mode signal IMD. As described in detail later, the first mode is designated by the high level of the (internal) mode signal (I)MD, the write control circuit 30 writes data into the memory cell array 20 8-bit by 8-bit in order and the read control circuit 40 read data from the array 20 8-bit by 8-bit in order. When the mode signal MD is changed to the low level to designate the second mode, the data write operation and read operation are performed 16-bit by 16-bit in order.

Since the 8-bit data read/write operation and 16-bit data read/write operation are supported, the number of data input terminals 101 supplied with write data WDT is 16 and that of data output terminals 104 from which read data RDT is outputted is 16. A write clock signal WCLK and a write reset signal WRST are supplied to terminals 102 and 103, respectively. A read clock signal RCLK and a read reset signal RRST are supplied to terminals 105 and 106, respectively.

Figure 2:
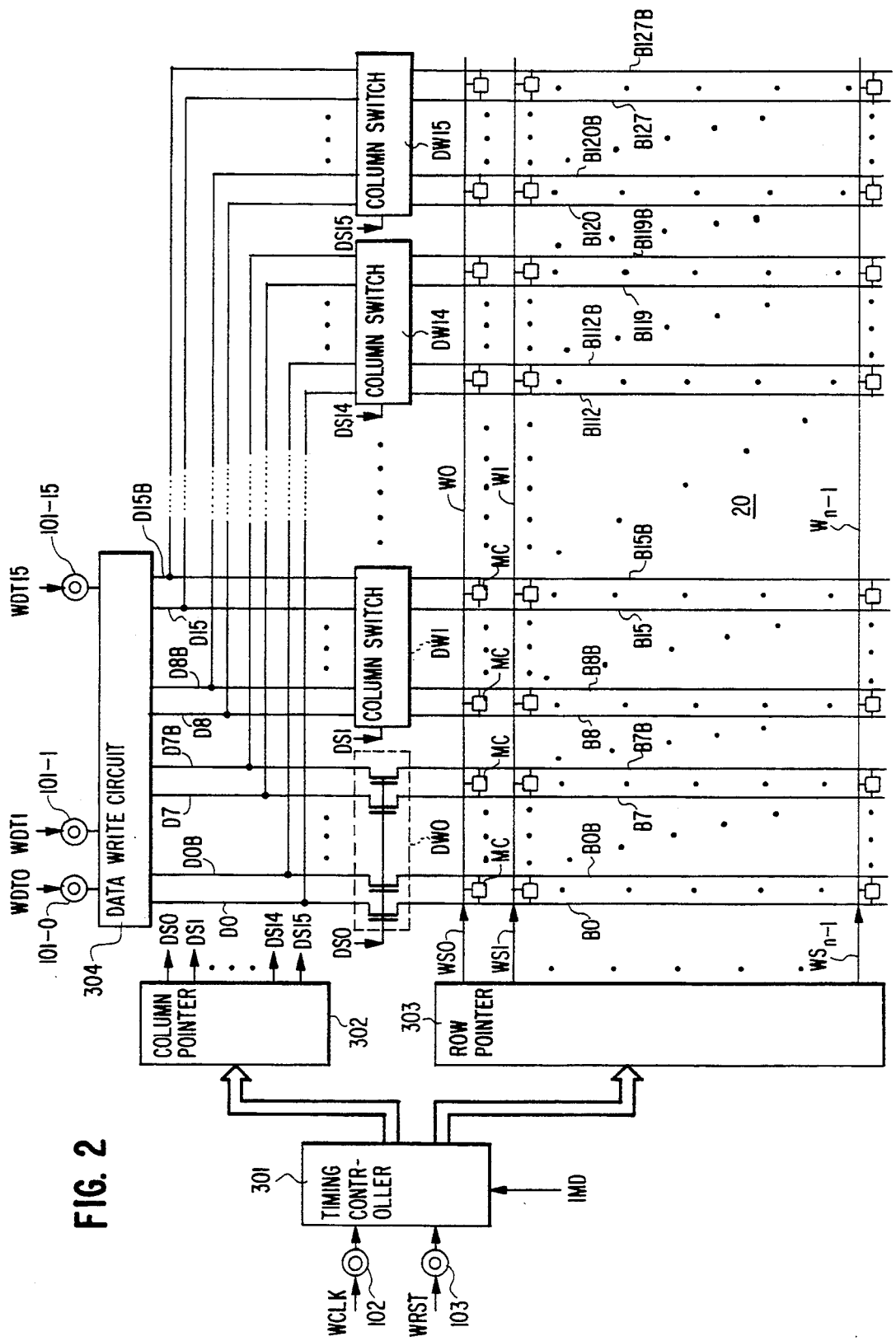
FIG. 2 is a circuit diagram representative of a memory cell array and a read control circuit shown in FIG. 1.

Referring to FIG. 2, the memory cell array 20 includes n word lines W0–Wn−1, 128 pairs of bit lines (B0, B0B)–(B127, B127B) and a plurality of memory cells MC disposed on the respective intersections of the word and bit lines. In this embodiment, each memory cell is of a static type.

The write control circuit 30 is further shown in FIG. 2. More specifically, the circuit 30 includes a row pointer 303 coupled to the word lines W0–Wn−1. One of the outputs WS0–WSn−1 is driven to the active high level to select one word line W. Coupled to the selected word line W are 128 memory cells in the present embodiment. Theses memory cell MC are divided into 16 groups each consisting of 8 memory cells. 16 column switches DW0–DW15 are provided correspondingly to those groups. As shown in the drawing, each column switch DW is composed of N-channel MOS transistors. The even-numbered column switches DW0, . . . , DW14 are connected in common to 8 pairs of digit lines (D0, D0B)–(D7, D7B) and odd-numbered column switches DW1, . . . , DW15 are connected in common to other 8 pairs of digit lines (D8, D8B)–(D15, D15B). Each of the column switches are turned ON by the active high level of a corresponding one of selection signals DS0–DS15 from the column pointer 302. The digit lines (D0, D0B)–(D15, D15B) are connected to a data write circuit 304 which are in turn connected to the data input terminals 101-0 to 101-15.

The column pointer 302 and row pointer 303 control the respective output signals DS0–DS15 and WS0–WSn−1 under the control of a timing controller 301. This controller 301 responds to the write clock signal WCLK and write reset signal WRST and further to the mode signal IMD to control the pointers 302 and 303.

Figure 3:
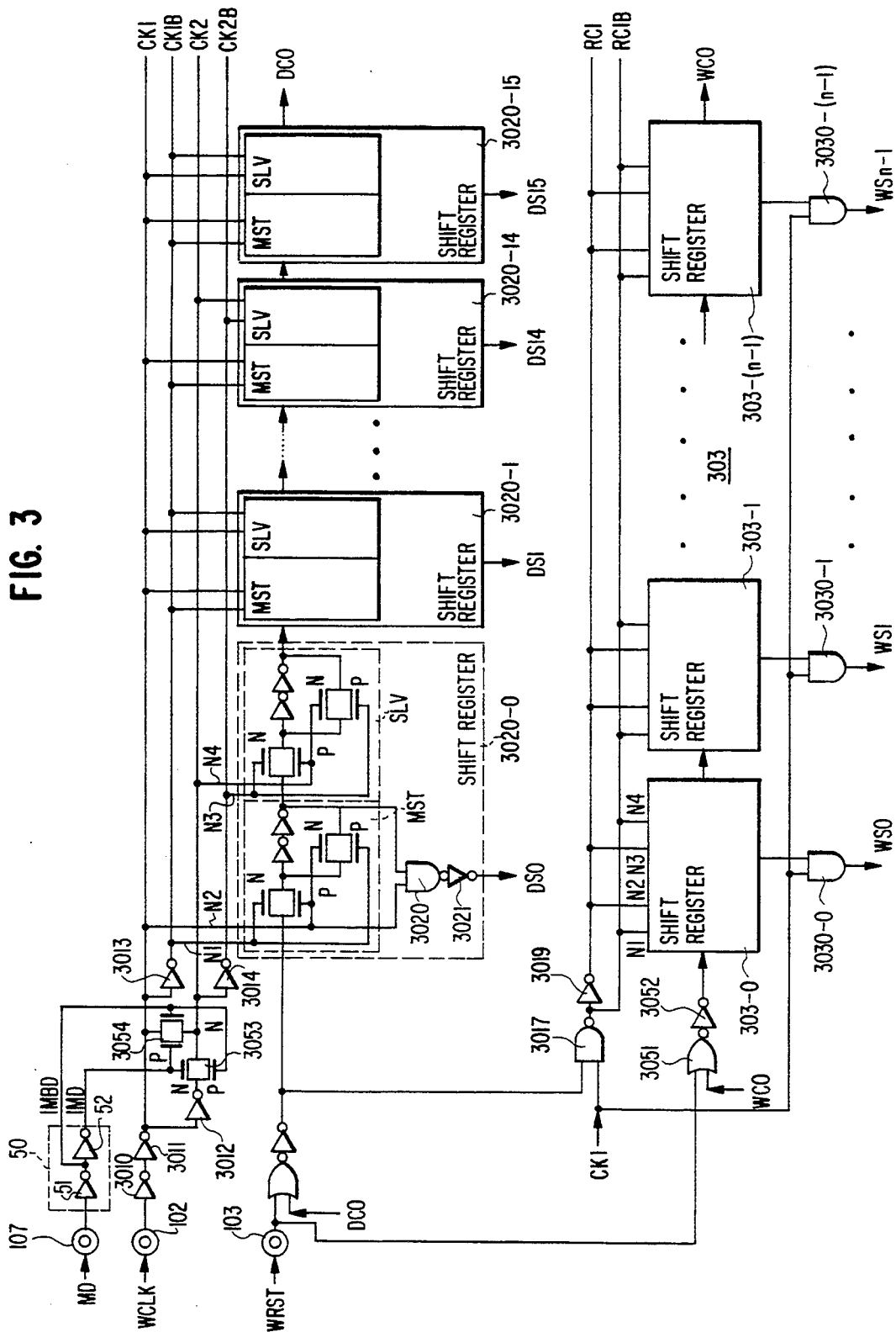
FIG. 3 is a circuit diagram representative of a row pointer, a column pointer and a timing controller shown in FIG. 2.

Turning to FIG. 3, the column pointer 302 includes 16 shift registers 302-0 to 302-15 connected in series. Since each of the shift registers are the same construction as each other, only the first shift register 302-0 is shown. This shift register 302-0 is of a master-slave type. A master flip-flop MST includes a first clock node N1, a second clock node N2, two transfer gates each composed of N-channel and P-channel transistors, and two inverters, which are connected as shown. A slave flip-flop SLV has the same construction as the master one MST. However, the first and second clock nodes of the slave one SLV is called N3 and N4, respectively. The shift register 302-0 further includes a NAND gate 3020 and an inverter 3021 and generates the column selection signal DS0. As shown, the clock nodes N2, N1, N4 and N3 of the even-numbered shift registers 302-0, . . . , 302-14 are connected to a first clock line CK1, its inverted clock line CK1B, a second clock line CK2 and its inverted clock line CK2B, respectively. Whereas the clock nodes N1,N2, N3 and N4 of the odd-numbered shift resisters 302-1, . . . , 302-15 are connected to the lines CK1B, CK1, CK1 and CK1B, respectively.

On these clock lines, clock signals synchronism with the write clock signal WCLK appear by five inverters 3010–3014 and two transfer gates 3053 and 3054 which constitute the timing controller 301. The transfer gates 3053 and 3054 are controlled in opened or closed state by the mode signal IMD and the inverted mode signal IMDB whose levels are in turn controlled by the mode signal MD by inverters 51 and 52. Specifically, when the mode signal MD takes the high level, the gate 3053 is opened or tuned ON and the gate 3054 is closed or tuned OFF, so that clock signals equal in phase to and opposite in phase to the write clock signal WCLK on the clock lines CK1 and CK2, respectively. On the other hand, in the case of the low level of the mode signal MD, the transfer gate 3054 is tuned ON, so that both the clock lines CK1 and CK2 take the signal equal in phase to the write clock signal WCLK.

The first shift register 302-0 is connected to an inverter 3016 supplied with the output of a NOR gate 3015 receiving the write reset signal WRST and a carry signal of the last shift register 302-15.

The row pointer 303 includes n pieces of shift registers 303-0 to 303-(n−1) connected in series. As shown in the drawing, the clock nodes N2 and N3 of each shift register are connected to a row clock line RC1 and the nodes N1 and N4 thereof are connected to its clock line RC1B. The clock line RC1 is supplied with the output signal of an inverter 3019 receiving the output signal of a NAND gate 3017, and the clock line RC1B is supplied with the output signal of the NAND gate 3017. The NAND gate 3017 is supplied with the clock signal CK1 and the output signal of an inverter 3016. The output signal of each shift register is supplied to the corresponding one of AND gates 3030 receiving the clock signal CK1 as another input, the output signal of the AND gate being used as the word line signal WS. The first shift register 303-0 is supplied as its input with ORed signal of the write reset signal WRST and a carry output signal of the last shift register 303-(n−1) through a NOR gate 3051 and an inverter 3052.

Figure 4:
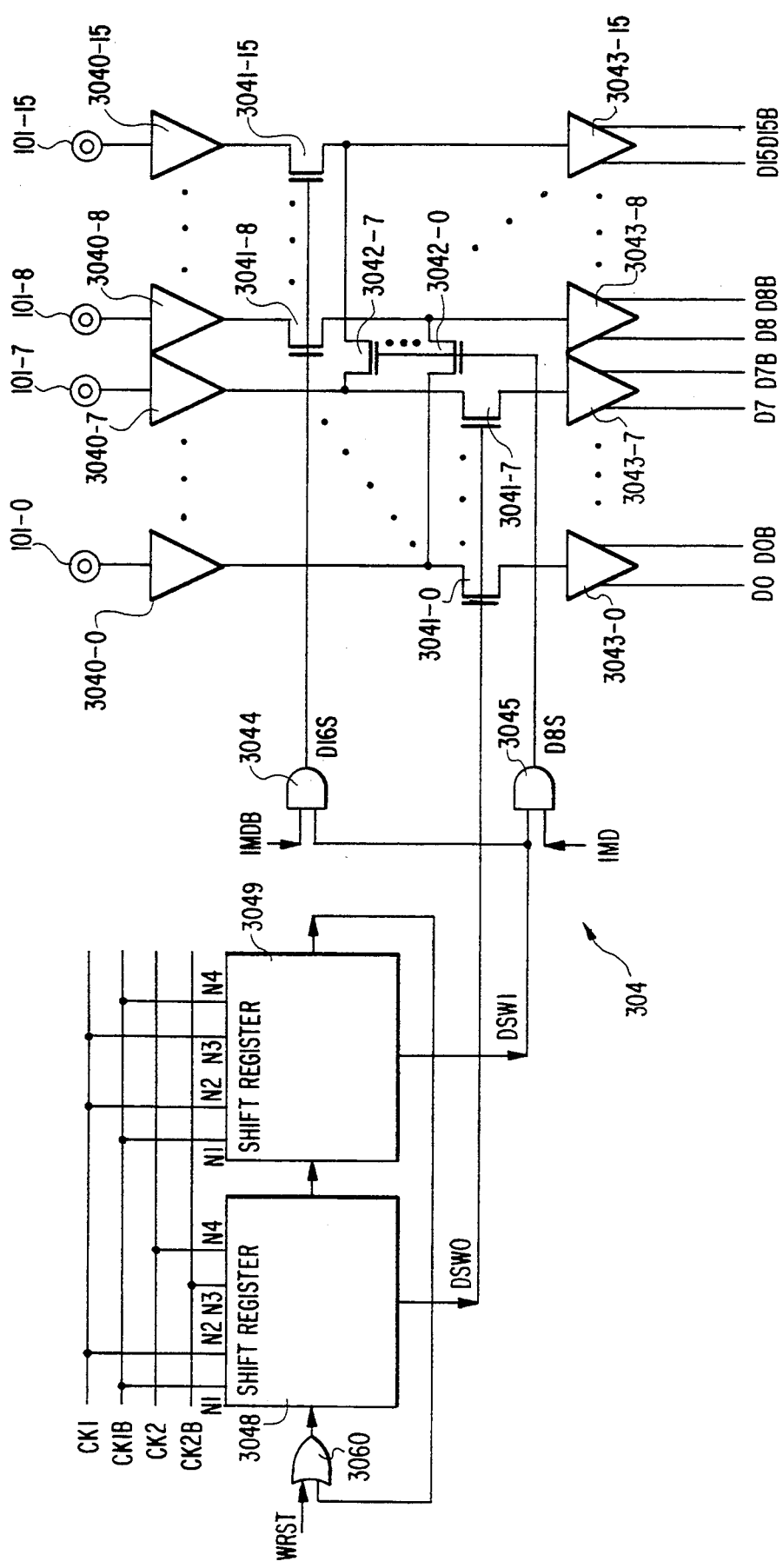
FIG. 4 is a circuit diagram representative of a data write circuit shown in FIG. 2.

Referring to FIG. 4, the data write circuit 304 includes input buffers 3040-0 to 3040-15 having input nodes connected respectively to the data input terminals 101-0 to 101-15 and output nodes connected respectively to data amplifiers 3043-0 to 3043-15 through N-channel transistors 3041-0 to 3041-15, respectively. The output of each data amplifier 3043 is connected to the corresponding digit line pair (D, DB). The outputs of the input buffers 3040-0 to 3040-7 are further connected to the data amplifiers 3043-8 to 3043-15 through N-channel MOS transistors 3042-0 to 3042-7, respectively. The transistors 3041-0 to 3041-7 are supplied in common at gates thereof with a data switching signal DSW0 from a shift register 3048. The gates of the transistors 3042-0 to 3042-7 are connected in common to an AND gate 3045 which preforms an AND operation on the mode signal IMD and a data switching signal DSW1 from a shift register 3049, and the gates of the transistors 3041-8 to 3041-15 are connected in common to an AND gate 3044 which performs the signals DSW1 and the inverted mode signal IMDB. Each of the shift registers 3048 and 3049 have the same construction as the shift register 302-0 and the clock nodes thereof N1–N4 are connected to the clock lines CK1, CK1B, CK2 and CK2B, respectively, as shown. The input of the shift register 3048 is connected to an OR gate 3060 receiving the write reset signal WRST and the carry output signal from the shift register 3049.

The read control circuit 40 (FIG. 1) also has a similar circuit construction to that of the write control circuit 30. However, in FIG. 4, the inputs of the data amplifiers 3043-0 to 3043-15 are connected to the digit lines D, and output buffers are used in place of the input buffers 3040. In addition, a row pointer of the read control circuit 40 is provided on the right side of the memory cell array 20 and a data read circuit including column switches thereof are provided on the lower side of the array 20.

Although the description will be made below on a data writing operation, a data reading operation is performed by regarding "data writing" as "data reading".

Figure 5:
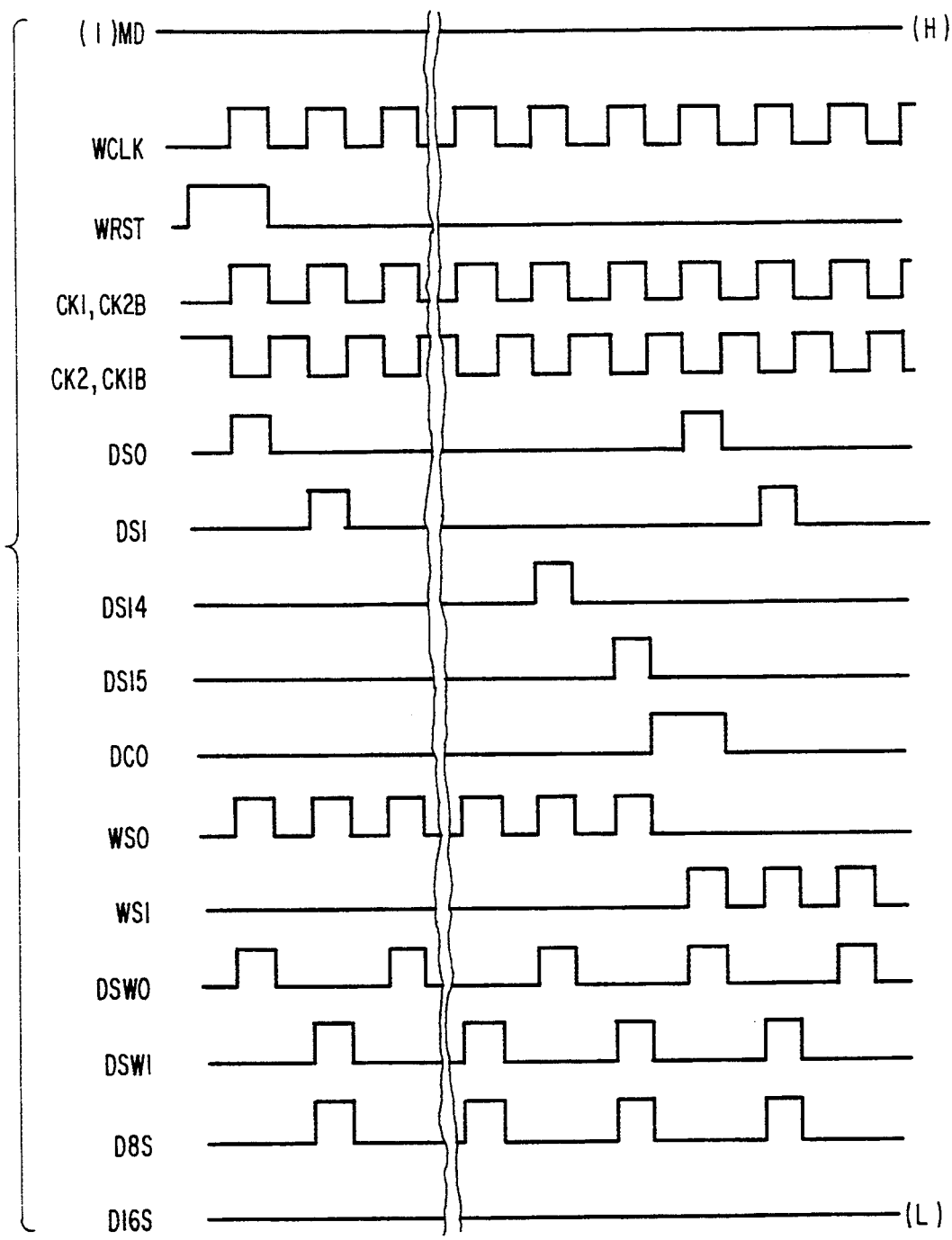
FIG. 5 is a timing chart indicative of an operation in a first mode.

When the mode signal MD takes the high level to designate the first mode (data writing in 8-bit units), the following data writing operation is performed in accordance with the timing chart shown in FIG. 5. More specifically, since the signal MD is at the high level, the same signal in phase as the write clock signal WCLK appears on the clock line CK1 and the opposite signal in phase to that appears on the clock line CK2. In order to write data into the first address, the write reset signal WRST is generated with a phase relationship as shown in FIG. 5. As a result, the row pointer 303 and column pointer 302 change the selection signals WS0 and DS0 to the active high level, respectively. The word line W0 is thus selected and the column switch DW0 is turned ON, so that the first, 8-bit memory cells are selected.

The shift register 3048 (FIG. 4) also produces the active high level data switching signal DSW0. The transistors 3041-0 to 3041-7 are thereby turned ON to connect the input buffers 3040-0 to 3040-7 to the data amplifiers 3043-0 to 3043-7, respectively. Thus, the 8-bit input data supplied to the input terminals 101-0 to 101-7 are written into the selected eight memory cells MC.

Each time the write clock signal WCLK changes to the high level, the data "1" in the shift register 302-0 is shifted to the succeeding shift registers in order, so that the column selection signal DS1–DS15 become the active high level in that order (FIG. 5). That is, the column switches DW1–DW15 are turned ON in that order. On the other hand, the clock signals to the respective shift registers in the row pointer 303 are not supplied because the NAND gate 3017 is closed, and hence the shift register 303-0 keeps to hold the data "1". By the AND gate 3030-0, the word selection signal WS0 for the word line W0 takes the active high level in synchronism with the clock signal WCLK (FIG. 5). In the shift registers 3048 and 3049 (FIG. 4), the carry output of the shift register 3049 is fed back to the shift register 3048 via the OR gate 3060, and therefore the data switching signals DSW0 and DSW1 take the active high level alternately in synchronism with the write clock signal WCLK, as shown in FIG. 5. That is, the sets of transistors 3041-0 to 3041-7 and those 3042-0 to 3042-7 are turned ON alternately. Thus, the 8-bit input data supplied to the terminals 101 are written into the succeeding addresses in that order.

When the shift register 302-15 produces the active high level selection signal DS15 to change the carry signal DC0 to the high level, the high level signal. DC0 is fed back to the shift register 302-0 via the gates 3015 and 3016. The selection signal DS0 is thereby changed again to the high level. At this time, the NAND gate 3017 ia made open to shift the data "1" to the shift register 303-1 from the shift register 303-0. The word selection signal WS1 for the word line W1 is changed to the active high level through the AND gate 3030-1, as shown in FIG. 5.

Thus, the high level of the mode signal MD designates the first mode to write 8-bit data to consecutive addresses in that order.

Figure 6:
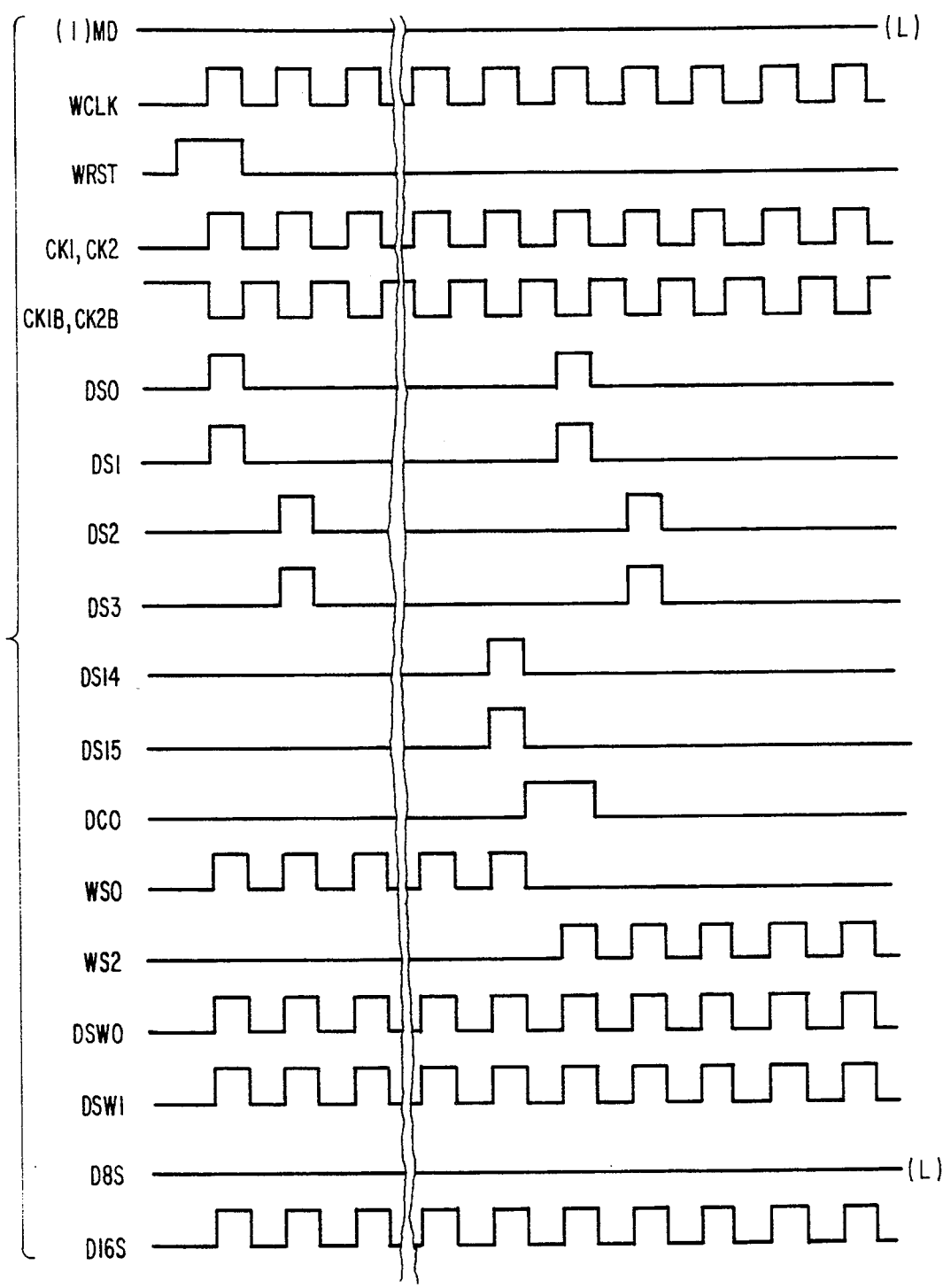
FIG. 6 is a timing chart indicative of an operation in a second mode.

When the mode signal MD is changed to the low level to designate the second mode (data writing in 16-bit units), the writing operation according to the timing chart of FIG. 6 is performed. More specifically, since the transfer gates 3054 and 3053 are turned ON and OFF, respectively, the same signal in phase as the write clock signal WCLK appear on both clock lines CK1 and CK2. As apparent from the connection between the clock nodes N1–N4 and the clock lines CL, the output of the OR gate (3015, 3016) is transferred through the shift register 302-0 and further through the waster flip-flop MST of the shift register 302-1 to the slave flip-flop thereof. Accordingly, the column selection signals DS0 and DS1 takes the active high level simultaneously with each other, the column switches DW0 and DW1 are both selected (FIG. 6).

Similarly, the data switching signals DSW0 and DSW1 from the shift registers 3048 and 3049 takes the active high level simultaneously with each other. The AND gate 3045 is however closed because of the low level of the signal IMD to turn the transistors 3042-0 to 3042-7 OFF. On the other hand, the AND gate 3044 is made open to turn the transistors 3041-8 to 3041-15 ON. Consequently, the 16-bit data supplied to the input terminals 101 are written into the selected 16 memory cells MC.

Each time the write clock signal WCLK changes the high level, the next two column switches are selected, so that the 16-bit data writing operation is performed.

As described above, the data writing and reading operation in 8-bit units are performed on the consecutive addresses in the first mode and those in 16-bit units are performed on the consecutive addresses in the second mode.

The row pointer 303 can be modified as shown by the column pointer 302 in FIG. 3 and the column pointer 303 can be also modified as shown by the row pointer 302 in FIG. 3. In this case, the word lines W0–Wn−1 are selected each time the write clock signal WCLK changes the high level in that order, whereas the column switch DW0 is kept being selected until the all the word lines W are selected once. Moreover, combinations other than 8-bit and 16-bit such as 4-bit, 8-bit, 16-bit and 32-bit can be similarly constituted.

Figure 7:
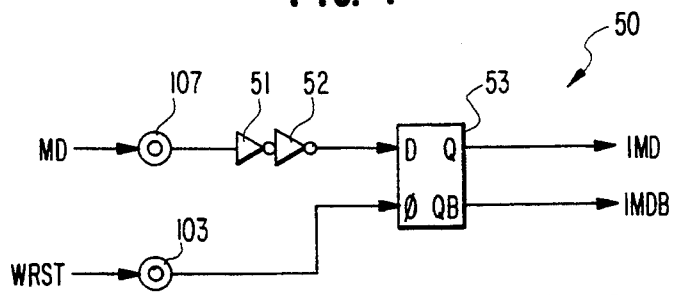
FIG. 7 is a circuit diagram representative of an improved one of an mode signal input circuit shown in FIG. 1.

As apparent from FIG. 3, the change in level of the mode signal MD is accepted anytime. That is, the 16-bit reading operation can be performed on data written by the 8-bit writing operation. Therefore, it is preferable that the change in mode is always carried out from the leading address. For this purpose, the input circuit 50 is modified as shown in FIG. 7. Specifically, the present input circuit further includes a D-type flip-flop 53 having a data input D supplied with the output of the inverter 52 and a clock input supplied with write reset signal WRST. The true output Q and inverted output QB are lead out as the internal mode signal IMD and inverted internal mode signal IMDB, respectively. Thus, the level of the mode signal MD is fetched only when the write reset signal WRST is changed to the active high level, and the internal mode signal IMD is controlled in accordance therewith. That is, the change in mode is performed only on resetting.

Figure 8:
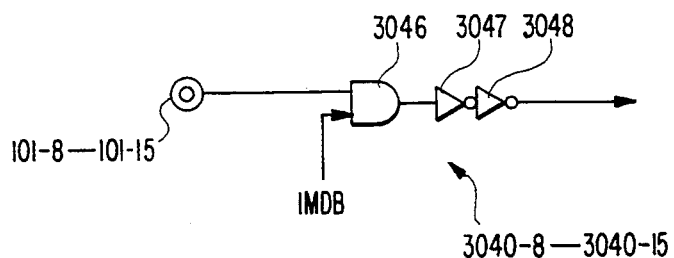
FIG. 8 is a circuit diagram representative of an improved one of an input buffer shown in FIG. 4.

In FIG. 4, the level of the input terminals 101-8 to 101-15 are at the invalid level during the first mode, so that the outputs of the input buffers 3040-8 to 3040-15 are not determined but take the high or low level to cause an error in operation in the internal circuit. Therefore, each of the input buffers 3040-8 to 3040-15 are preferably constructed as shown in FIG. 8. That is, each of the input terminals 101-8 to 101-15 is connected to one input end of the corresponding AND gate 3046 having the input end supplied with the inverted internal mode signal IMDB. The output of the AND gate 3046 is supplied to the corresponding transistor 3041 via the inverters 3047 and 3048. Consequently, the output of the AND gate 3046 is held at the low level in the first, 8-bit mode, so that the respective outputs of the input buffers 3040-8 to 3040-15 are also held at the low level.

Figure 9:
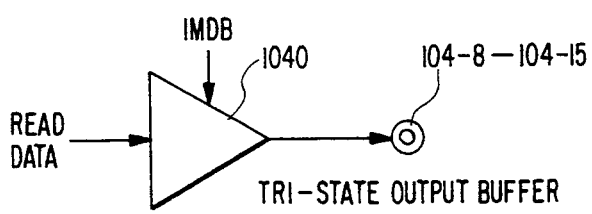
FIG. 9 is a circuit diagram representative of an improved one of an output buffer included in a read control circuit shown in FIG. 1.

Also in the output terminals 104 (FIG. 1), there are eight terminals which are not used in the first mode. These output terminals are connected to the corresponding external data bus lines (not shown). Therefore, each of the output buffers connected to such output terminals are preferably constructed by a tri-state buffer 1040 as shown in FIG. 9. When the inverted mode signal IMDB takes the low level to designate the first mode, the tri-state buffer 1040 is brought into a high impedance state.

It apparent that the present invention is not limited to the above embodiments but may be changed and modified without departing from the scope and spirit of the invention.

What is claimed is:

1. A semiconductor memory of a first-in first-out type comprising:
    a memory portion for storing a plurality of words each consisting of a plurality of bits,
    a write control circuit responding to a write clock signal to write data into said memory portion one word by one word in a first mode, and to write data into said memory portion a plurality of words by a plurality of words in a second mode, and
    a read control circuit responding to a read clock signal to read data from said memory portion one word by one word in said first mode and to read data from said memory portion a plurality of words by a plurality of words in said second mode.

2. The semiconductor memory as claimed in claim 1, wherein said write control circuit further responds to a write reset signal to select a leading word location of said memory portion into which data is to be written first, and wherein said read control circuit further responds to a read reset signal to select said leading word location of said memory portion from which data is to be read first, said write control circuit being allowed to change between said first mode and said second mode in response to said write reset signal, said read control circuit being allowed to change between said first mode and said second mode in response to said read reset signal.

3. A semiconductor memory of a first-in first-out type, comprising:
    a memory portion for storing a plurality of words each consisting of a plurality of bits,
    a write control circuit responding to a write clock signal to write data into said memory portion one word by one word in a first mode and a plurality of words by a plurality of words in a second mode, and
    a read control circuit responding to a read clock signal to read data from said memory portion one word by one word in said first mode and a plurality of words by a plurality of words in said second mode, said write control circuit including a plurality of data input terminals and a plurality of input buffers coupled to said data input terminals, respectively, said read control circuit including a plurality of data output terminals and a plurality of output buffers coupled to said data output terminals, respectively, a part of said input buffers holding logic levels thereof in said first mode irrespective of data supplied to a corresponding part of said data input terminals, and a part of said output buffers being deactivated in said first mode to bring a corresponding part of said data output terminals into a high impedance state.

4. A semiconductor memory comprising:
    a memory cell array including a plurality of memory cells,
    means, responsive to a mode signal, for generating first control information representative of a first mode, and for generating second control information representative of a second mode,
    first selecting means, responsive to said first control information, for selecting a first number of memory cells each time a write clock signal is generated, and responsive to said second control information for selecting a second number of memory cells each time said write clock signal is generated, said first number being different from said second number,
    second selecting means, responsive to said first control information, for selecting a third number of memory cells each time a read clock signal is generated, and responsive to said second control information for selecting a fourth number of memory cells each time said read clock signal is generated, said third number being different from said fourth number,
    means for writing data into memory cells selected by said first selecting means, and
    means for reading out data from memory cells selected by said second selecting means.

5. The semiconductor memory as claimed in claim 4, wherein said first number and said third number are equal to each other, and wherein said second number and said fourth number are equal to each other.

6. A semiconductor memory comprising:
    a plurality of first lines,
    a plurality of second lines intersecting each of said first lines,
    a plurality of memory cells disposed at intersections of said first lines and said second lines,
    designating means, responsive to a mode signal, for designating one of a first mode and a second mode,
    selecting means, responsive to a clock signal, for selecting a first quantity of said first lines each time said clock signal is output, while selecting one of said second lines when said first mode is designated, and for selecting a second quantity of said first lines each time said clock signal is output, while selecting said one of said second lines when said second mode is designated, said first quantity being different from said second quantity, and
    accessing means for accessing memory cells disposed at the intersections of selected ones of said first lines and a selected one of said second lines.

7. The semiconductor memory as claimed in claim 6, wherein each of said first lines is a bit line and each of said second lines is a word line.

8. A semiconductor memory comprising:

a plurality of bit lines, a plurality of word lines intersecting each of said bit lines, a plurality of memory cells disposed at intersections of said bit lines and said word lines, designating means, responsive to a mode signal, for designating one of a first mode and a second mode, selecting means, responsive to a clock signal, for selecting a first quantity of said bit lines each time said clock signal is output, while selecting one of said word lines when said first mode is designated, and for selecting a second quantity of said bit lines each time said clock signal is output, while selecting said one of said word lines when said second mode is designated, said first quantity being different from said second quantity, and accessing means for accessing memory cells disposed at the intersections of selected ones of said bit lines and a selected one of said word lines, said accessing means including a plurality of column switches each coupled to corresponding ones of said bit lines, and wherein said selecting means includes a column pointer and a row pointer, said column pointer turning one of said column switches ON each time said clock signal is supplied thereto when said first mode is designated and turning at least two of said column switches ON each time said clock signal is supplied thereto when said second mode is designated, said row pointer continuing to select one of said word lines until all of said column switches are turned ON.

9. The semiconductor memory as claimed in claim 8, wherein said column pointer comprises a first shift register circuit having a plurality of output nodes each connected to a corresponding one of said column switches and said row pointer comprises a second shift register circuit having a plurality of output nodes each connected to a corresponding one of said word lines.

10. The semiconductor memory as claimed in claim 8, wherein said accessing means is supplied to a reset signal to be brought into an initial state, said designating means designating one of said first and second modes in synchronism with said reset signal.

11. A semiconductor memory comprising:

a plurality of first lines, a plurality of second lines intersecting each of said first lines, a plurality of memory cells disposed at intersections of said first lines and said second lines, designating means, responsive to a mode signal, for designating one of a first mode and a second mode, selecting means, responsive to a clock signal, for selecting a first quantity of said first lines each time said clock signal is output, while selecting one of said second lines when said first mode is designated, and for selecting a second quantity of said first lines each time said clock signal is output, while selecting said one of said second lines when said second mode is designated, said first quantity being different from said second quantity, and accessing means for accessing memory cells disposed at the intersections of selected ones of said first lines and a selected one of said second lines, said accessing means including a plurality of input terminals supplied with data to be written, a plurality of input buffers coupled to said input terminals, respectively, a plurality of output buffers supplied with data read out from the memory cells, and a plurality of output terminals coupled to said output buffers, respectively, a part of said input buffers holding output nodes thereof at a predetermined logic level irrespective of data supplied to a corresponding part of said input terminals in said first mode and a part of said output buffers being deactivated in said first mode to bring a corresponding part of said output terminals into a high impedance state.

* * * * *